United States Patent [19]
King et al.

[11] Patent Number: 5,835,945
[45] Date of Patent: Nov. 10, 1998

[54] MEMORY SYSTEM WITH WRITE BUFFER, PREFETCH AND INTERNAL CACHES

[75] Inventors: Edward C. King, Fremont, Calif.; Jackson L. Ellis, Fort Collins, Colo.; Robert B. Moussavi, San Diego, Calif.; Pirmin L. Weisser, Unterkirnach, Germany

[73] Assignee: NCR Corporation, Dayton, Ohio

[21] Appl. No.: 563,216

[22] Filed: Aug. 6, 1990

[51] Int. Cl.⁶ .................................................. G06F 12/08
[52] U.S. Cl. .................... 711/120; 711/125; 711/126; 711/128
[58] Field of Search .................. 395/425, 400; 364/200 MS, 900 MS; 711/120, 137, 129, 173, 143

[56] References Cited

U.S. PATENT DOCUMENTS

| | | | |
|---|---|---|---|
| 4,078,254 | 3/1978 | Beausoleil et al. | 395/425 |
| 4,445,174 | 4/1984 | Fetcher | 395/425 |
| 4,458,310 | 7/1984 | Chang | 395/446 |
| 4,843,542 | 6/1989 | Dashiell et al. | 395/425 |
| 4,933,910 | 6/1990 | Olson et al. | 365/230.02 |
| 5,025,366 | 6/1991 | Baror | 395/425 |
| 5,034,917 | 7/1991 | Bland et al. | 395/425 |
| 5,091,846 | 2/1992 | Sachs et al. | 395/250 |
| 5,113,506 | 5/1992 | Moussouris et al. | 395/400 |
| 5,123,095 | 6/1992 | Papadopoulos et al. | 395/375 |
| 5,155,824 | 10/1992 | Edenfield et al. | 395/425 |
| 5,276,851 | 1/1994 | Thacker et al. | 395/425 |
| 5,317,718 | 5/1994 | Jouppi | 395/425 |
| 5,335,336 | 8/1994 | Kametani | 395/425 |
| 5,535,539 | 7/1996 | Hata et al. | 395/446 |

FOREIGN PATENT DOCUMENTS 0340668  8/1989  European Pat. Off. ........ G06F 12/08

*Primary Examiner*—Eddie P. Chan
*Assistant Examiner*—Hiep Nguyen
*Attorney, Agent, or Firm*—Douglas S. Foote; George H. Gates

[57] ABSTRACT

A statistically fast, high performance computer memory system including a system memory for storing code and non-code data accessible by at least two bus masters, a bus connecting the memory with the bus masters, and a plurality of caches connected to the bus. An internal cache holds data selected solely on the basis of memory accesses by the host processor, a pre-fetch cache pre-fetches code from the memory, and a write buffer cache connected to the bus for buffering data written to the memory.

23 Claims, 2 Drawing Sheets

Microfiche Appendix Included
(3 Microfiche, 263 Pages)

MEMORY SYSTEM WITH WRITE BUFFER, PREFETCH AND INTERNAL CACHES

The present invention relates to computer memory systems. More particularly, it relates to memory systems which are designed to reduce memory access time.

CROSS-REFERENCE TO RELATED APPLICATIONS

"Computer Memory Page Bias Method and System", U.S. patent application Ser. No. 563,221, filed concurrently herewith, invented by Edward C. King and F. Vincentinus Vermeer.

"Computer Memory System", U.S. patent application Ser. No. 563,214, filed concurrently herewith, invented by Edward C. King, Forrest O. Arnold, Jackson L. Ellis, Robert B. Moussavi, Pirmin L. Weisser and F. Vincentinus Vermeer.

"Data Prefetch Method and System", U.S. patent application Ser. No. 563,215, filed concurrently herewith, invented by Pirmin L. Weisser, F. Vincentinus Vermeer and Edward C. King.

"Method for Merging Data in A Computer Memory System", U.S. patent application Ser. No. 563,219, filed concurrently herewith, invented by Edward C. King, Forrest O.

Arnold, Jackson L. Ellis, Robert B. Moussavi, Pirmin L. Weisser and F. Vincentinus Vermeer.

"Computer Memory System and Method for Cleaning Data Elements", U.S. patent application Ser. No. 563,217, filed concurrently herewith, invented by Jackson L. Ellis.

"Mapped Cache Structure and Method", U.S. patent application Ser. No. 563,218, filed concurrently herewith, invented by Robert B. Moussavi and Jackson L. Ellis.

"Computer Memory System and Method for Enhancing Performance on Cache Overflows", U.S. patent application Ser. No. 563,220, filed concurrently herewith, invented by Jackson L. Ellis, Robert B. Moussavi and Edward C. King.

REFERENCE TO A MICROFICHE APPENDIX

A microfiche appendix is provided herewith. The appendix includes three microfiche having a combined total of 263 frames.

BACKGROUND OF THE INVENTION

The performance of a computer system can be enhanced by the use of a memory hierarchy. For example, a three tiered memory can be constructed from low, medium, and high speed memories. A low speed memory may be a magnetic disk for low cost, bulk storage of data. A medium speed memory may be constructed from DRAMs for use as the computer system's main memory. A high speed memory may employ SRAMs for use as a processor cache memory. The theory behind memory hierarchy is to group code (instructions) and other data to be executed by the system processor in the highest speed memory. Since high speed memory is typically the most expensive memory available, economics dictate that it be relatively small. Main memory consisting of DRAMs is denser and less expensive than a cache memory with SRAMs, and can therefore be significantly larger than the cache memory.

During operation, instructions and other data are transferred from system memory to the cache memory in order to have quick access to the variables of the currently executing program. As additional data, not in the cache, is required, such data is transferred from the main memory by replacing selected data in the cache. Various replacement algorithms are utilized to determine which data is replaced.

By definition, an efficiently operating cache architecture is one which exhibits a high ratio of "hits" to accesses. A "hit" occurs when data requested is in the cache. A number of factors influence the hit ratio. The dominate factor is the locality of reference of the code being executed. In other words, if the code is located in proximate physical locations in memory, the hit ratio will be higher than if the code is widely distributed throughout memory. Another factor influencing the hit ratio of a cache is the number of devices having access to the memory. If only a single bus master, such as the system processor, has access to the memory, the data stored in the cache can be controlled to achieve a reasonably high hit ratio. However, when more than a single bus master has access to the memory through the same cache, the cache can bounce back and forth between requests from the bus masters, greatly reducing the hit ratio. In other words, the cache is non-discriminatory, with the demands of the system processor and other bus masters affecting the cache equally. One operation can significantly impact the data make-up of the cache. For example, data cached in response to memory accesses from a non-host CPU bus master will overwrite data needed by the host processor.

Another factor affecting the hit ratio relates to the fact that both code and non-code data are cached. Blocks of data in the system memory are mapped into different physical locations in the cache. If each block of data in system memory may be mapped to only a single location, the cache is known as a direct mapped cache. Set associative mapping involves each block of data being mapped to more than a single location. For example, if each block of data may be mapped to either of two locations, the cache is known as two-way set associative. Irrespective of the number of locations available for a system memory block, when both code and non-code data are being cached, there will be overlap in their respective mappings. Thus, when both code and non-code data are cached, there can be significant thrashing which takes place as data is replaced in response to memory accesses.

One way of improving the hit ratio, for the foregoing scenario, is to separate code and non-code data. For example, Harvard Architecture Caching provides separate caches for code and non-code data, respectively. It also requires separate code and non-code data busses which increases the complexity of the system.

OBJECTS OF THE INVENTION

It is therefore an object of the present invention to provide a new and improved high performance computer memory system.

It is another object of the present invention to provide a statistically fast memory system.

It is a further object of the present invention to provide a memory system which provides high performance with a relatively small physical caching structure.

It is yet another object of the present invention to provide a high performance and low cost memory system.

It is yet a further object of the present invention to provide a memory system for use with multiple bus masters.

It is still another object of the present invention to provide a multiple cache memory architecture.

It is still a further object of the present invention to provide a memory system which has multiple configurations.

SUMMARY OF THE INVENTION

The present invention is a statistically fast, high performance computer memory system. The system includes a system memory for storing code and non-code data accessible by at least two bus masters, a bus connecting the memory with the bus masters, and a plurality of caches connected to the bus. A first of the caches holds data selected solely on the basis of memory accesses by a first of the masters, and a second of the caches contains solely code data.

DESCRIPTION OF A PREFERRED EMBODIMENT

Figure 1:
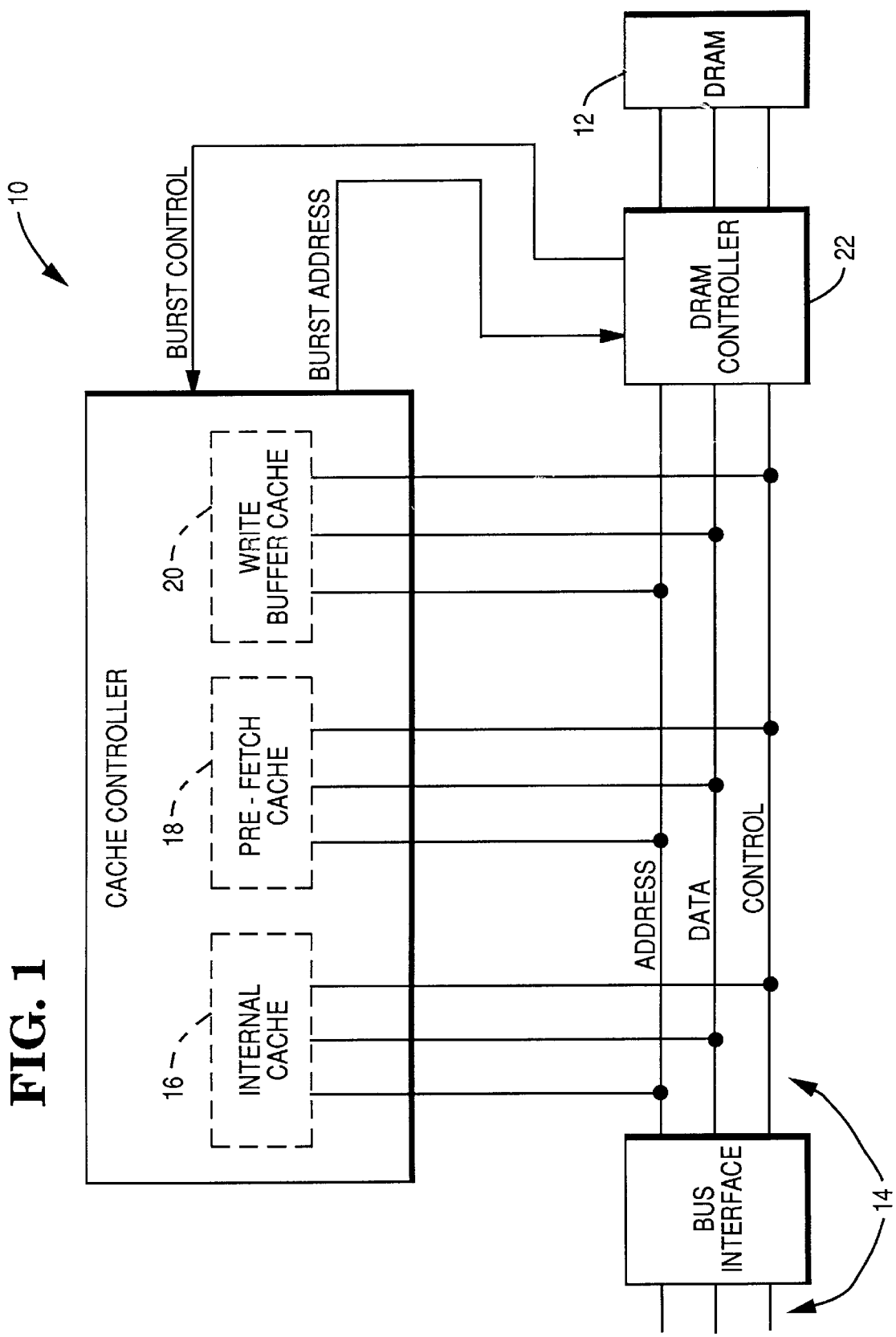
FIG. 1 is a block diagram of a high performance computer memory system according to one form of the present invention.

FIG. 1 shows a block diagram of a computer memory system 10. System 10 includes a system memory 12 which in a preferred embodiment consists of dynamic random access memory (DRAM) chips. The data stored in memory 12 can be generally divided into code data (instructions) and non-code data. As used herein, the term "data" refers to information and includes both code data (instructions) and non-code data. Memory 12 is connected to other parts of a computer system (not shown) by a bus 14. Memory system 10 is designed for use with two or more bus masters, although it is operable with a single master. More particularly, it is designed for use with a host processor such as an Intel processor 386, 386sx or 486 in combination with other bus masters or devices which will compete with the host processor for access to memory system 10. Access to DRAM 12 is controlled by DRAM controller 22 which is located within bus 14.

Memory system 10 also includes an internal cache 16, a pre-fetch cache 18 and a write buffer cache 20, each connected to bus 14. In a preferred form, internal cache 16 is a 4K byte, four-way set associative cache, pre-fetch cache 18 is a 128 byte, direct-mapped cache, and write buffer cache 20 is a 128 byte, two-way set associative cache.

A feature of the present invention is that the functionality of the various caches may be varied depending upon the host processor type (386, 386sx or 486) utilized. However, certain features of the caches do not vary. For example, internal cache 16 holds data which is selected solely on the basis of memory accesses by the host processor. In other words, internal cache 16 is dedicated to the host processor and will not be affected by memory accesses by other bus masters. It will be appreciated that each of the caches is readable by any of the bus masters. Thus, even though cache 16 will not allow data writes therein based on memory accesses by other than the system processor, it will be read by another bus master if requested data happens to reside therein. It will further be appreciated that each of the caches snoops (observes) any data writes not intended for it in order to invalidate its contents upon snoop hits, thereby ensuring coherency.

Another immutable feature of the caches is that pre-fetch cache 18 contains solely code data pre-fetched from DRAM 12. Furthermore, it only pre-fetches code based on a memory access by the host processor. In operation, whenever the system processor requests code data not already in the pre-fetch cache, the next sequential 128 bytes of code are pre-fetched into cache 18 as a queue in anticipation of subsequent requests for code.

Write buffer cache 20 only buffers data to be written into DRAM 12. It is not merely a write buffer, but is a cache which, as mentioned above, can be read by any bus master. However, it will not cache data from DRAM 12.

An important feature of the present invention is the separation of the functionality of each of the caches and the selective definition of those functions based on the processor type. By this insight, the present system is able to achieve or exceed the performance of a system utilizing a cache many times larger than the cumulative size of the subject caches. With respect to the selective definition of function based on processor type, for a system employing a 486 system processor, write buffer cache 20 buffers data writes by any bus master other than the system processor. For a system employing a 386 or 386sx system processor, internal cache 16 holds only code data and is a read only cache for the system processor, and write buffer cache 20 buffers data writes by any bus master including the system processor. The operational characteristics of the caches are defined through self configuration at power-on time based on information relating to the type of host processor present.

DRAM controller 22 supports fast page mode for accesses to DRAM 12. Fast page mode is a well known technique for speeding up accesses to DRAM by activating a row line in a memory page and then strobing sequential column lines to transfer data into or out of DRAM. In the present invention, DRAM 12 is divided into pages which contain either code or non-code data. A register associated with DRAM 12 is located either in DRAM 12 or DRAM controller 22 and holds the page address of a most recently accessed page. In effect, the system provides a bias towards code pages or non-code pages depending upon the type of processor connected to the system. For example, if the system processor is a 486, the address of the most recently accessed code address page is held in the register. In operation, both code and non-code data pages in DRAM 12 can be randomly accessed. If a code page is accessed on one cycle and a non-code page is accessed on the next cycle, the address of the code page is held in a register while the non-code page is accessed. Immediately after the non-code page access, the address in the register is used to reopen the code page. In contrast, if the system processor is a 386 or 386sx, the address of the most recently accessed non-code address page is held in the register. The combination of selective open page bias, fast page mode accesses and multiple caches provides increased system performance.

The use of a two-way set associative cache for write buffer cache 20 is an important feature of the present invention. The non-code data region of memory may be divided into three areas known as list, heap and stack. Data blocks in memory are reserved for the list, heap and stack, each of which has its own organization and purpose. For example, a stack is a set of data elements, only one of which can be accessed at a time. The list data is primarily read and generally not written to. In structured programs, a high percentage of writes occur to the stack with the second most data writes occurring to the heap. By proper assignment of the heap and stack data blocks in DRAM and mapping-respective blocks to opposing sets in the two-way set associative cache, increased operational efficiency can be realized. Furthermore, an open page bias in the DRAM for non-code data will effectively be an open page bias for list data. In this manner, operational efficiency of the subject invention is further enhanced.

The detail design of the present invention is captured in CDL, a high level hardware description language. CDL is a software tool which unambiguously defines the hardware for a digital logic system. The CDL listing completely defines a preferred embodiment of computer memory system 10. The listing may be compiled to generate a "C" source code which may then be compiled by a C compiler to generate a standardized C Object File Format (COFF). The COFF is then input to a logic synthesis program to provide a detailed logic schematic. A logic synthesis program which may be used for this purpose is SYNOPSYS, available from Synopsys Inc., Mountain View, Calif.

Figure 2:
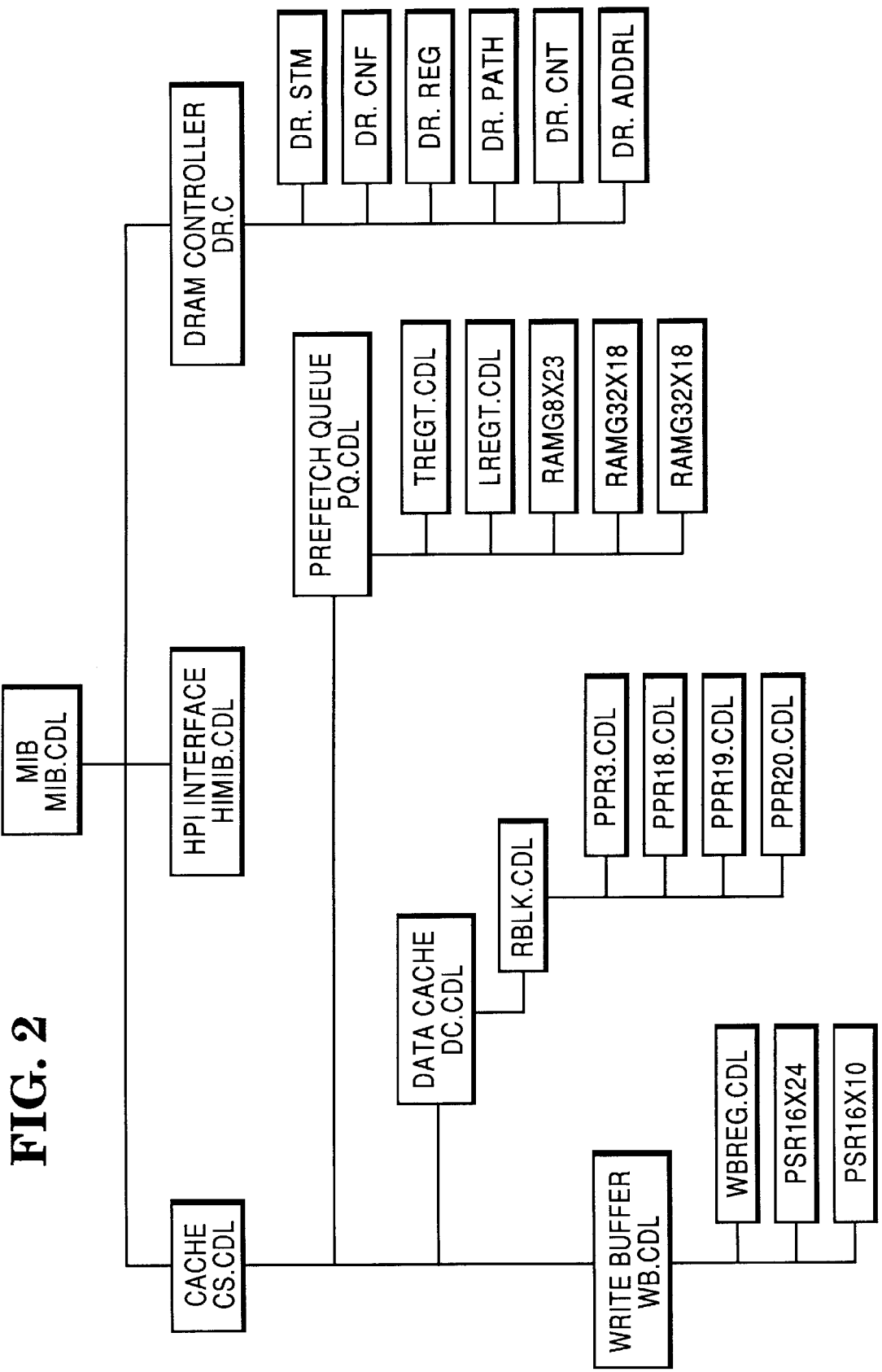
FIG. 2 is a block diagram showing the relationship between modules of the memory system.

FIG. 2 shows the relationship between the modules of the present invention. The structure and mode of operation of each of these modules is defined by the CDL listing, provided herewith as a microfiche appendix.

It will be clear to those skilled in the art that the present invention is not limited to the specific embodiment disclosed and illustrated herein. Nor is the invention limited to applications employing 386, 386sx or 486 processors.

Numerous modifications, variations, and full and partial equivalents can be undertaken without departing from the invention as limited only by the spirit and scope of the appended claims.

What is desired to be secured by Letters Patent of the United States is as follows.

What is claimed is:

1. In a computer, a high performance memory system in which first and second bus masters external to the memory system are directly connected thereto by a bus, said memory system comprising:

a system memory for storing code and non-code data;

a first cache, in which data is prefetched only in response to an access request by said first bus master for a data element that is located only in said system memory; and a second cache;

wherein said caches and system memory are directly connected to said bus so that data is transferred over said bus for each bus master access to said system memory and said first and second caches.

2. The system of claim 1 wherein each of said caches is readable by each of said bus masters.

3. The system of claim 1 wherein said first bus master is a host processor.

4. The system of claim 3 wherein said first cache contains solely code data.

5. The system of claim 3 wherein said first cache is a four-way set associative cache.

6. The system of claim 1 wherein said second cache holds only code data pre-fetched from said memory.

7. The system of claim 6 wherein said second cache is a direct-mapped cache.

8. The system of claim 1, wherein said memory system includes a third cache, connected to said bus in parallel with said first and second caches, for buffering data written to said system memory.

9. The system of claim 8 wherein said third cache buffers data from other than said first bus master.

10. The system of claim 8 wherein said write buffer cache is a two-way set associative cache.

11. The system of claim 1, wherein said system memory includes a plurality of first pages and a plurality of second pages, each of said pages having a page address, and is operable in a fast page mode, further comprising:

a register associated with said memory for holding the page address of the most recently accessed page of said first pages;

wherein said page address in said register is used to reopen the most recently accessed page of said first pages after one of said second pages has been accessed.

12. The system of claim 11 wherein said first pages store code data only.

13. The system of claim 11 wherein said first pages store non-code data only.

14. The system of claim 1, wherein said first bus master is selected from processors having different operational characteristics, further comprising:

means for changing an operational characteristic of at least one of said caches as the function of the processor changes.

15. In a computer having a host processor and at least one other device connected to a bus, a high performance memory system comprising:

a system memory for storing code and non-code data;

an internal cache for holding data selected only on the basis of memory accesses by said host processor;

a pre-fetch cache for pre-fetching code data from said system memory; and a write buffer cache for buffering data written to said system memory wherein said caches and system memory are connected to said bus so that data is transferred over said bus for each access to said memory system by said processor or other device.

16. The system of claim 15, wherein said system memory includes a plurality of first pages and a plurality of second pages, each of said pages having a page address, and is operable in a fast page mode, further comprising:

a register associated with said memory for holding the page address of the most recently accessed page of said first pages;

wherein said page address in said register is used to reopen the most recently accessed page of said first pages after one of said second pages has been accessed.

17. The system of claim 16, wherein said host processor is selectable from a plurality of different types of processors having different operational characteristics, further comprising:

means for changing an operational characteristic of at least one of said caches as the function of the processor changes.

18. The system of claim 17, wherein each of said caches is readable by said host processor and device.

19. The system of claim 18 wherein said internal cache is a four-way set associative cache;

said pre-fetch cache is a direct-mapped cache; and said write buffer cache is a two-way set associative cache.

20. The system of claim 19 wherein said write buffer cache buffers data from said other device and not by said host processor.

21. The system of claim 20 wherein said first pages store code data only.

22. The system of claim 19 wherein said internal cache contains solely code data.

23. The system of claim 22 wherein said first pages store non-code data only.

* * * * *

UNITED STATES PATENT AND TRADEMARK OFFICE
CERTIFICATE OF CORRECTION

| | |
|---|---|
| PATENT NO. | : 5,835,945 |
| APPLICATION NO. | : 07/563216 |
| DATED | : November 10, 1998 |
| INVENTOR(S) | : Edward C. King et al. |

It is certified that error appears in the above-identified patent and that said Letters Patent is hereby corrected as shown below:

On the Title Page, Item (75), after "Unterkirnach, Germany" add --Fulps V. Vermeer, Donkere Garde, The Netherlands--

Signed and Sealed this

Third Day of November, 2009

David J. Kappos
*Director of the United States Patent and Trademark Office*